United States Patent
Kim (10) Patent No.: US 8,592,077 B2
(45) Date of Patent: Nov. 26, 2013

(54) RECHARGEABLE BATTERY

(75) Inventor: Dae-Kyu Kim, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 13/477,179

(22) Filed: May 22, 2012

(65) Prior Publication Data

US 2013/0078503 A1  Mar. 28, 2013

(30) Foreign Application Priority Data

Sep. 26, 2011 (KR) .................. 10-2011-0096922

(51) Int. Cl.
- *H01M 2/00* (2006.01)
- *H01M 2/02* (2006.01)
- *H01M 2/08* (2006.01)

(52) U.S. Cl.
USPC ............ 429/163; 429/174; 429/164; 429/167

(58) Field of Classification Search
USPC ......... 429/163, 164, 183, 176, 186, 170, 169, 429/208, 174, 247; 180/68.5
IPC ....................................................... H01M 2/02
See application file for complete search history.

(56) References Cited

U.S. PATENT DOCUMENTS

| | | | |
|---|---|---|---|
| 8,048,559 B2 | 11/2011 | Kim | |
| 8,053,101 B2 | 11/2011 | Chang et al. | |
| 8,062,787 B2 | 11/2011 | Kim | |
| 2006/0263679 A1* | 11/2006 | Park et al. | 429/164 |
| 2007/0154789 A1* | 7/2007 | Chang et al. | 429/130 |
| 2011/0064995 A1* | 3/2011 | Kim | 429/174 |
| 2011/0076548 A1* | 3/2011 | Kim | 429/163 |
| 2011/0076549 A1* | 3/2011 | Kim | 429/174 |

FOREIGN PATENT DOCUMENTS

| | | |
|---|---|---|
| KR | 10-2006-0031939 A | 4/2006 |
| KR | 10-2007-0071240 | 7/2007 |
| KR | 10-2008-0107051 A | 12/2008 |
| KR | 10-2011-0028200 | 3/2011 |

* cited by examiner

*Primary Examiner* — Patrick Ryan
*Assistant Examiner* — Kiran Quraishi
(74) *Attorney, Agent, or Firm* — Lee & Morse, P.C.

(57) ABSTRACT

A rechargeable battery includes an electrode assembly including electrodes on both sides of a separator, a case including the electrode assembly and electrically connected to an electrode on one side of the electrode assembly, and a cap assembly coupled with the case and electrically connected to another electrode of the electrode assembly, wherein an external side of the electrode assembly and an internal side of the case are attached to face each other, and at least one of the external side of the electrode assembly and the internal side of the case is in the form of a screw unit.

11 Claims, 6 Drawing Sheets

RECHARGEABLE BATTERY

BACKGROUND

1. Field

The described technology relates generally to a rechargeable battery including an electrode assembly inserted into a case.

2. Description of the Related Art

The need for a rechargeable battery as an energy source has been increasing according to development and requirements for mobile devices. For example, a cylindrical rechargeable battery includes an electrode assembly formed by disposing electrodes on both sides of a separator and spirally winding the same in a jellyroll form, a case including the electrode assembly, and a cap assembly for closing and sealing an opening on one side of the case.

In the electrode assembly, the electrode includes a coated region formed by coating an active material on a current collector and an uncoated region established by exposing the current collector at an end of the coated region, and the uncoated region is provided at both ends of the electrode assembly in a width direction. The uncoated region is connected to the case through an electrode current collecting plate, or it is connected to the cap assembly through the electrode current collecting plate and a lead tab.

SUMMARY

According to an embodiment, there is provided a rechargeable battery including an electrode assembly including electrodes on both sides of a separator, a case including the electrode assembly and electrically connected to an electrode on one side of the electrode assembly, and a cap assembly coupled with the case and electrically connected to another electrode of the electrode assembly, wherein an external side of the electrode assembly and an internal side of the case are attached to face each other, and at least one of the external side of the electrode assembly and the internal side of the case is in a form of a screw unit.

The screw unit may be a male thread on an insulating tape surrounding the electrode assembly.

The screw unit may be present in an entire range in a height direction of the insulating tape.

The screw unit may be present in a part of a range in a height direction of the insulating tape.

The screw unit may be present on a top and bottom of the range in the height direction of the insulating tape.

The screw unit may include a male thread on an insulating tape surrounding the electrode assembly, and a female thread inside the case to engage the male thread in a mating relationship therewith.

The male thread and the female thread may be present in an entire range in a height direction of the insulating tape and the case.

At least one of the male thread and the female thread may be present in a part of a range in a height direction of the insulating tape and the case.

The female thread may be present inside the case in an entirety of the range in the height direction, and the male thread is present on the external side of the insulating tape at a bottom of the range in the height direction.

The screw unit may include a male thread on an insulating tape surrounding the electrode assembly, and a female thread in an inserting member disposed inside the case and combined with the male thread.

The inserting member may extend for an entire range in a height direction of the insulating tape.

The inserting member may be attached to the inside of the case

BRIEF DESCRIPTION OF THE DRAWINGS

Features will become apparent to those of ordinary skill in the art by describing in detail exemplary embodiments with reference to the attached drawings in which.

DETAILED DESCRIPTION

Korean Patent Application No. 10-2011-0096922, filed on Sep. 26, 2011 in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

Figure 1:
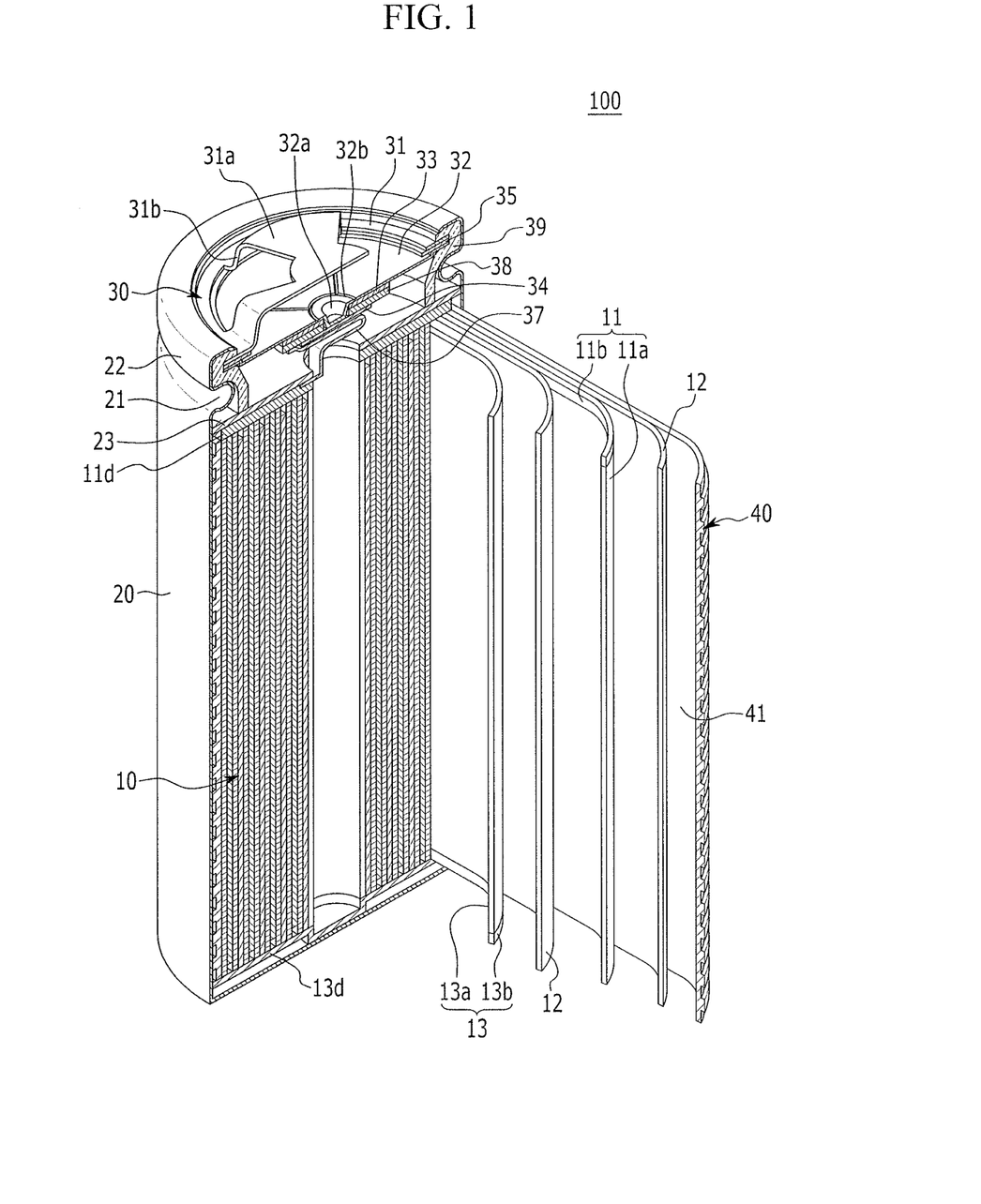
FIG. 1 illustrates a cross-sectional perspective view of a rechargeable battery according to a first exemplary embodiment.

FIG. 1 shows a cross-sectional perspective view of a rechargeable battery 100 according to a first exemplary embodiment. Referring to FIG. 1, the rechargeable battery 100 may include an electrode assembly 10 for performing a charging and discharging operation, a case 20 for receiving the electrode assembly 10, a cap assembly 30 combined with an opening of the case 20 and electrically connected to the electrode assembly 10, and a screw unit 40 provided to one of the electrode assembly 10 and the case 20.

The electrode assembly 10 may include a positive electrode 11, a separator 12, and a negative electrode 13 that are sequentially stacked and disposed. The electrode assembly 10 may be formed by winding the positive electrode 11, the negative electrode 13, and the separator 12, which is an insulator disposed between the electrodes, in a jellyroll shape.

For example, the electrode assembly 10 may be formed to be cylindrical. The cylindrical electrode assembly 10 may include a sector pin at the center thereof. The sector pin may maintain the electrode assembly 10 in a cylindrical shape.

The positive electrode 11 and the negative electrode 13 may include coated regions 11a and 13a that are formed by coating the active material on both surfaces of the current collector formed to be a thin metal plate, and uncoated regions 11b and 13b on which the active material is not coated to expose the current collector and that are set on ends that are opposite to each other.

In the state of the jellyroll, the positive electrode current collecting plate 11d may be connected to the positive electrode uncoated region 11b of the electrode assembly 10, and the negative electrode current collecting plate 13d may be connected to the negative electrode uncoated region 13b of the electrode assembly 10.

The case 20 forms an opening on one side so as to insert the electrode assembly 10 from the outside. The case 20 may be formed to be cylindrical so as to receive the cylindrical electrode assembly 10. The case 20 may be connected to the negative electrode current collecting plate 13d and may function as a negative terminal in the rechargeable battery 100. The case 20 may be formed with a conductive metal such as aluminum, an aluminum alloy, or nickel-plated steel.

The cap assembly 30 may provide a gasket 39 to the opening of the case 20 and may be combined with the same to be electrically insulated from the case 20. The cap assembly 30 closes and seals the case 20 for receiving the electrode assembly 10 and the electrolyte solution. The cap assembly 30 may be electrically connected to the electrode assembly 10 through a current intercepting device.

For example, the cap assembly 30 may include a cap plate 31, a positive temperature coefficient element (PTC) 35, a vent plate 32, an insulating member 33, a middle plate 38, and a sub-plate 34 that are sequentially disposed toward the inner part of the case 20 from the outer part.

The cap plate 31 may be connected to the positive electrode current collecting plate 11d to function as a positive electrode terminal in the rechargeable battery 100, and may form a protruded unit 31a that protrudes outside the case 20 and an exhaust hole 31b that opens toward a side of the protruded unit 31a and that discharges internal gas.

The current intercepting device may be formed by the vent plate 32, the sub-plate 34, and their connector. The connector may be formed by connecting the vent plate 32 and the sub-plate 34 through welding.

The vent plate 32 forming one side of the current intercepting device may be installed inside the cap plate 31 and may be electrically connected to the sub-plate 34 forming another side of the current intercepting device.

The vent plate 32 may include a vent 32a that is broken under a predetermined pressure condition to discharge the internal gas and intercept the electrical connection with the sub-plate 34.

For example, the vent 32a may protrude toward the inside of the case 20 at the vent plate 32. The vent plate 32 may include a notch 32b near the vent 32a for guiding rupture of the vent 32a.

Therefore, when the internal pressure of the case 20 is increased by the generation of gas, the notch 32b is ruptured to discharge gas to the outside through the vent plate 32 and the exhaust hole 31b. Thereby, an explosion of the rechargeable battery 100 may be prevented.

In this instance, when the connector of the vent plate 32 and the sub-plate 34 is separated because of rupture of the vent 32a, the electrode assembly 10 and the cap plate 31 are electrically separated from each other.

The positive temperature coefficient element 35 may be provided between the cap plate 31 and the vent plate 32, and may control a current between the cap plate 31 and the vent plate 32 according to the internal temperature of the rechargeable battery 100.

When the internal temperature exceeds the predetermined temperature, the positive temperature coefficient element 35 has an electrical resistance that increases without limit. Accordingly, the positive temperature coefficient element 35 may prevent the flow of the charging or discharging current between the cap plate 31 and the vent plate 32.

The sub-plate 34 may face the vent plate 32 with an insulating member 33 therebetween, and may be electrically connected to the vent 32a. The middle plate 38 may be disposed between the insulating member 33 and the sub-plate 34. The vent 32a may protrude through the through holes of the insulating member 33 and the middle plate 38 and may be connected to the sub-plate 34.

Therefore, the middle plate 38 may be electrically connected to the sub-plate 34 and the vent 32a. Further, the middle plate 38 may be connected to the lead tab 37 through welding, and the lead tab 37 may be connected to the positive electrode current collecting plate 11d through welding.

As a result, the positive electrode current collecting plate 11d may sequentially pass through the lead tab 37, the middle plate 38, the sub-plate 34, the vent 32a, the vent plate 32, and positive temperature coefficient element 35, and may then be electrically connected to the cap plate 31.

The top insulating plate 23 may be disposed between the positive electrode current collecting plate 11d and the sub-plate 34 to electrically insulate the positive electrode current collecting plate 11d from the sub-plate 34 or the middle plate 38. The lead tab 37 may be connected to the positive current collecting plate 11d and may then be connected to the middle plate 38 through the through hole of the top insulating plate 23.

The cap assembly 30 may include a gasket 39 to be inserted into the opening of the case 20. The cap assembly 30 may be fixed to the opening of the case 20 through a crimping process to form the rechargeable battery 100.

In this instance, the case 20 may provide a beading unit 21 and a gasket 39 inserted in the center of the diameter direction of the case 20 on the side of the opening to form a clamper 22 for holding an external circumference of the assembly 30.

In addition, the screw unit 40 may control the mobility of the height direction (the up-and-down direction in FIG. 1) of the electrode assembly 10 inside the case 20. The screw unit 40 may be formed in various ways to reinforce the combination of the case 20 and the electrode assembly 10.

Figure 2:
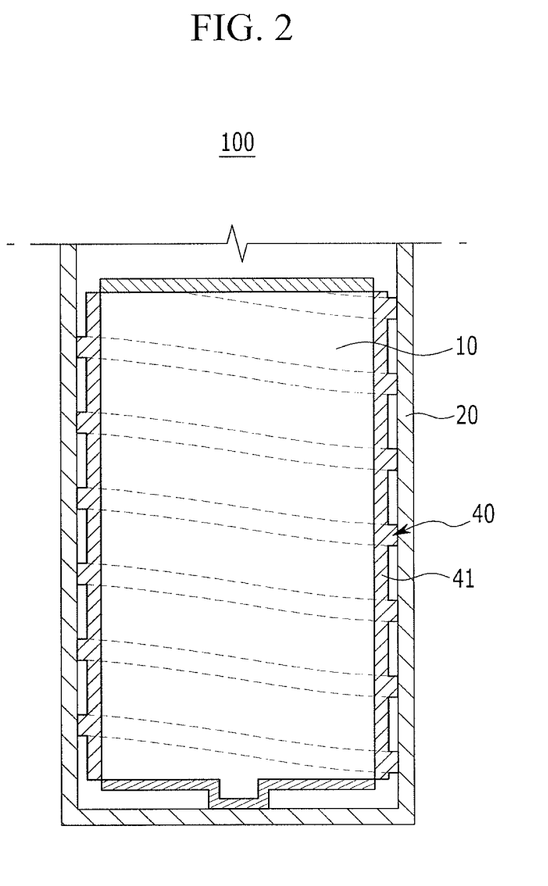
FIG. 2 illustrates a cross-sectional view of a gap between an electrode assembly and a case of FIG. 1.

FIG. 2 shows a cross-sectional view of a gap between an electrode assembly 10 and a case 20 of FIG. 1. Referring to FIG. 2, as an example, the screw unit 40 may be formed on an insulating tape 41 surrounding the electrode assembly 10, and may be a male thread.

The insulating tape 41 may be wound on the electrode assembly 10 and attached thereto to electrically insulate the electrode assembly 10 and the inside of the case 20. The screw unit 40 may be formed on the external surface of the insulating tape 41, may be inserted into the case 20 along with the electrode assembly 10, and may be closely attached to the inside of the case 20 to reinforce the combination of the electrode assembly 10 and the inside of the case 20.

The electrode assembly 10 wrapped with the insulating tape 41 on which the screw unit 40 is formed may be rotated on the side of the opening of the case 20 and may be inserted into the case 10. Therefore, the electrode assembly 10 may minimize resistance of the opening and may be easily inserted into the case 20 when the electrode assembly 10 includes the screw unit 40.

For example, the insulating tape 41 of the screw unit 40 may be made of synthetic resins, and may be transformed and compressed between the electrode assembly 10 and the case 20 to increase combination thereof and thereby efficiently prevent up-and-down movement of the electrode assembly 10 inside the case 20.

Also, the screw unit 40 may be formed throughout the entire range that is set in the height direction (up-and-down direction of FIG. 2) of the electrode assembly 10 and the insulating tape 41 to thus maximize the combination of the case 20 and the electrode assembly 10.

That is, the screw unit 40 may closely fix the electrode assembly 10 to the inside of the case 20 in the entire range of the height direction to resist against the movement in the up-and-down direction of the electrode assembly 10. Hence, the movement of the electrode assembly 10 in the height direction in the case 20 may be controlled or prevented.

Figure 3:
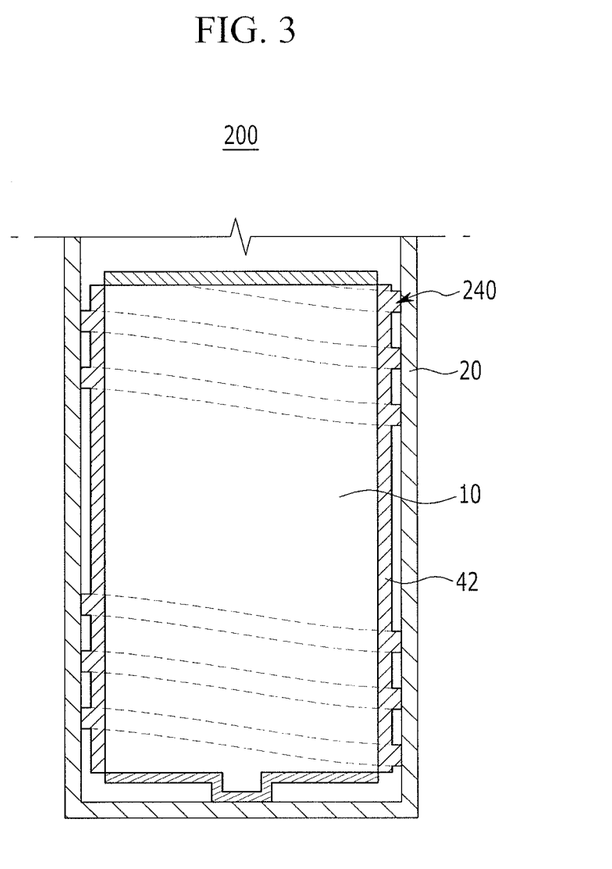
FIG. 3 illustrates a cross-sectional view of a gap between an electrode assembly and a case in a rechargeable battery according to a second exemplary embodiment.

FIG. 3 shows a cross-sectional view of a gap between an electrode assembly 10 and a case 20 in a rechargeable battery 200 according to a second exemplary embodiment. Referring to FIG. 3, as an example, the screw unit 240 may be formed in a part of the range that is set in the height direction (up-and-down direction of FIG. 3) of the insulating tape 42.

For example, the screw unit 240 may be formed on the top and the bottom of the range that is set in the height direction of the insulating tape 42. Therefore, when the electrode assembly 10 is inserted into the case 20, the screw unit 240 is transformed and compressed in the case 20 on the top and the bottom of the electrode assembly 10 to improve the combination thereof.

In the first exemplary embodiment, the screw unit 40 may be formed over the whole range of the height direction of the insulating tape 41, and in the second exemplary embodiment, the screw unit 240 may be formed on the range of the top and the bottom of the height direction of the insulating tape 42.

In the second exemplary embodiment, the insulating tape 42 may reduce the range of the screw unit 240 and may support both ends of the electrode assembly 10 toward the case 20, thereby forming and maintaining the combination of the electrode assembly 10 and the case 20.

Figure 4:
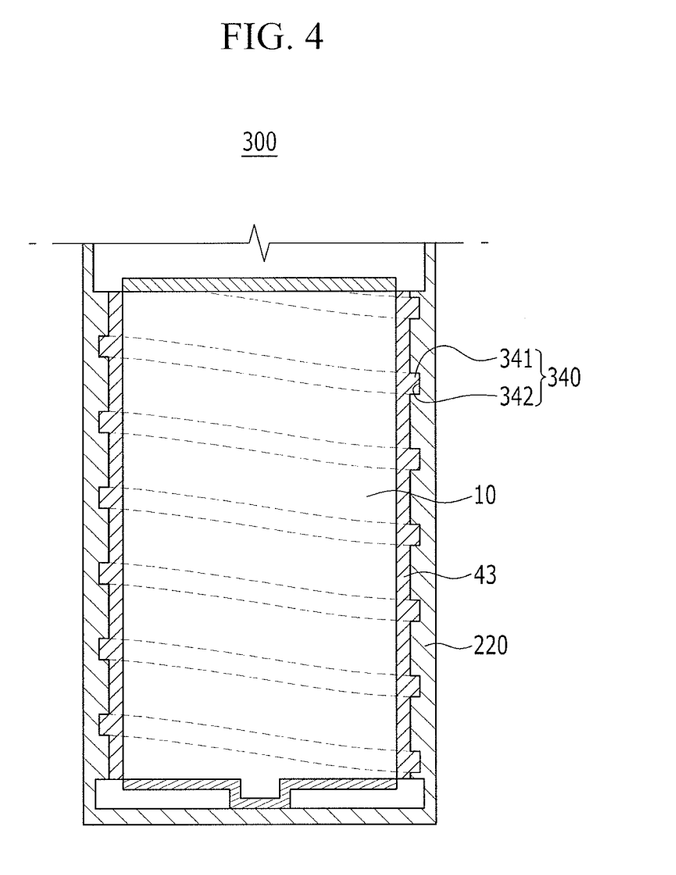
FIG. 4 illustrates a cross-sectional view of a gap between an electrode assembly and a case in a rechargeable battery according to a third exemplary embodiment.

FIG. 4 shows a cross-sectional view of a gap between an electrode assembly 10 and a case 220 in a rechargeable battery 300 according to a third exemplary embodiment. Referring to FIG. 4, as an example, the screw unit 340 may be formed on an outside of the insulating tape 43 and on an inside the case 220 facing each other.

For example, the screw unit 340 may include a male thread 341 formed on the insulating tape 43 surrounding the electrode assembly 10 and a female thread 342 formed inside the case 220 and combined with the male thread 341. Therefore, the electrode assembly 10 surrounded by the insulating tape 43 may be rotated, inserted into, and combined with the case 220.

In the range that is set in the height direction of the case 220, the male thread 341 may be formed in the whole range of the insulating tape 43, and the female thread 342 may be formed in the whole range of the case 220 so the male thread 341 is combined with the female thread 342.

In the third exemplary embodiment, the male thread 341 and the female thread 342 may be formed on the insulating tape 43 and the case 220, respectively, and may be screwed in the entire range of the height direction thereby further improving the combination state of the electrode assembly 10 and the case 220 compared to the first and second exemplary embodiments.

That is, the male thread 341 and the female thread 342 may screw and combine the electrode assembly 10 with the inside of the case 220 in the entire range of the height direction to resist against the movement in the up-and-down direction of the electrode assembly 10. Therefore, the movement of the electrode assembly 10 in the height direction in the case 220 may be more efficiently prevented.

Figure 5:
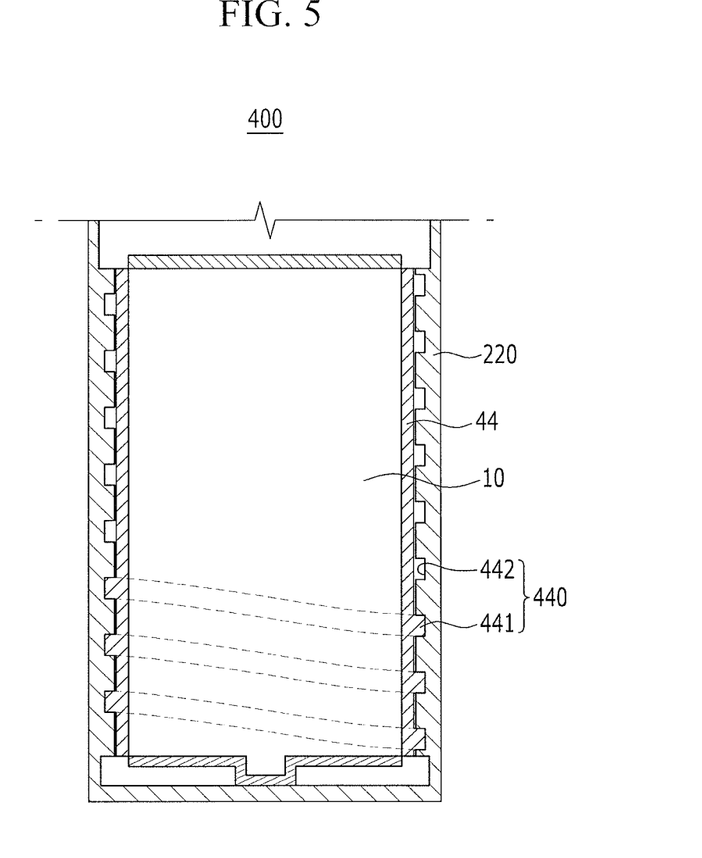
FIG. 5 illustrates a cross-sectional view of a gap between an electrode assembly and a case in a rechargeable battery according to a fourth exemplary embodiment.

FIG. 5 shows a cross-sectional view of a gap between an electrode assembly 10 and a case 220 in a rechargeable battery 400 according to a fourth exemplary embodiment.

In the third exemplary embodiment, the screw unit 340, that is, the male thread 341 and the female thread 342, may be formed in the whole range of the height direction, and in the fourth exemplary embodiment, the screw unit 440 may be formed in a part of the range of the height direction. That is, the male thread 441 or the female thread 442 can be formed in part of the range of the height direction.

Referring to FIG. 5, as an example, the male thread 441 may be formed on the bottom of the entire range that is set on the external surface of the insulating tape 44 in the height direction, and the female thread 442 may be formed in the entire range that is set in the internal side of the case 220 in the height direction.

Therefore, the electrode assembly 10 surrounded by the insulating tape 44 having formed the male thread 441 on the bottom may be inserted into and combined with the case 220 in a rotatable manner. In the fourth exemplary embodiment, the electrode assembly 10 having initially formed the male thread 441 may be rotated inside the case 220 and be screwed therein.

The male thread 441 and the female thread 442 may be screwed into, combined with, and fixed to the case 220 at the bottom of the electrode assembly 10 in the entire range of the height direction and may resist against the up-and-down movement of the electrode assembly 10.

Figure 6:
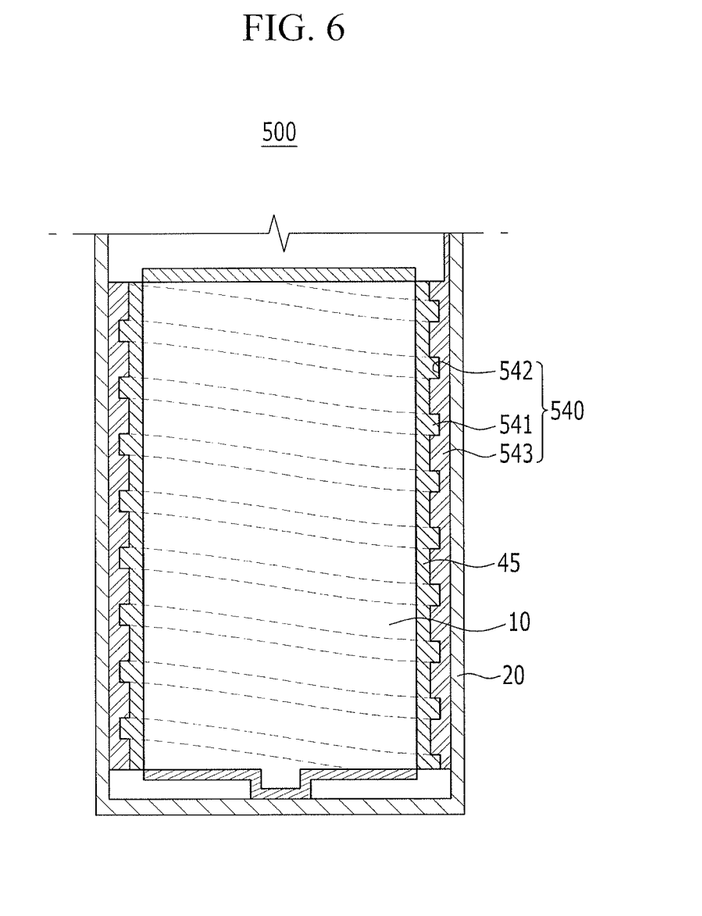
FIG. 6 illustrates a cross-sectional view of a gap between an electrode assembly and a case in a rechargeable battery according to a fifth exemplary embodiment.

FIG. 6 shows a cross-sectional view of a gap between an electrode assembly 10 and a case 20 in a rechargeable battery 500 according to a fifth exemplary embodiment. In the fifth exemplary embodiment, the screw unit 540 may further include an inserting member 543.

That is, the screw unit 540 may include a male thread 541 formed on the insulating tape 45 surrounding the electrode assembly 10 and a female thread 542 formed in the inserting member 543 and combined with the male thread 541. The inserting member 543 may be inserted between the insulating tape 45 and the inside of the case 20, and may be attached to the inside of the case 20.

The inserting member 543 may be inserted in the entire range that is set inside the case 20 in the height direction. The inserting member 543 may solve the difficulty of forming a female thread inside the case 20.

Further, when the inserting member is applied, the male thread of the insulating tape and the female thread of the inserting member may be selectively formed in a part of the entire range of the height direction (not shown).

By way of summation and review, when the typical rechargeable battery is assembled, the electrode assembly is inserted into the case toward the uncoated region of the negative electrode or the uncoated region of the positive electrode. In this instance, the electrode assembly is moved in the up-and-down direction with respect to the opening of the case and is then inserted in a straight-line manner.

When the typical electrode assembly is inserted into and combined with the case in the up-and-down direction and the rechargeable battery is exposed to vibration or impacts, the electrode assembly may be easily moved. Therefore, electrical connections may be disconnected between the electrode assembly and the cap assembly.

The present embodiments may advance the art by providing a rechargeable battery in which the stability of the electrical connection may be improved by controlling the mobility of the electrode assembly that is inserted into the case. For example, according to at least one embodiment, the electrode assembly may be received in the case, and the screw unit may be formed on the outside of the electrode assembly and the inside of the case that tightly face each other, thereby controlling movement of the inserted electrode assembly and improving stability of the electrical connection.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A rechargeable battery comprising:
an electrode assembly including electrodes on both sides of a separator;
a case including the electrode assembly and electrically connected to an electrode on one side of the electrode assembly; and
a cap assembly coupled with the case and electrically connected to another electrode of the electrode assembly, wherein
an external side of the electrode assembly and an internal side of the case are attached to face each other, and
at least one of the external side of the electrode assembly and the internal side of the case is in a form of a screw unit, the screw unit being a male thread on an insulating tape surrounding the electrode assembly.

2. The rechargeable battery as claimed in claim 1, wherein the screw unit is present in an entire range in a height direction of the insulating tape.

3. The rechargeable battery as claimed in claim 1, wherein the screw unit is present in a part of a range in a height direction of the insulating tape.

4. The rechargeable battery as claimed in claim 3, wherein the screw unit is present on a top and bottom of the range in the height direction of the insulating tape.

5. A rechargeable battery comprising:
an electrode assembly including electrodes on both sides of a separator;
a case including the electrode assembly and electrically connected to an electrode on one side of the electrode assembly; and
a cap assembly coupled with the case and electrically connected to another electrode of the electrode assembly, wherein
an external side of the electrode assembly and an internal side of the case are attached to face each other, and
at least one of the external side of the electrode assembly and the internal side of the case is in a form of a screw unit, wherein the screw unit includes:
a male thread on an insulating tape surrounding the electrode assembly, and
a female thread inside the case to engage with the male thread in a mating relationship therewith.

6. The rechargeable battery as claimed in claim 5, wherein the male thread and the female thread are present in an entire range in a height direction of the insulating tape and the case.

7. The rechargeable battery as claimed in claim 5, wherein at least one of the male thread and the female thread is present in a part of a range in a height direction of the insulating tape and the case.

8. The rechargeable battery as claimed in claim 7, wherein the female thread is present inside the case in an entirety of the range in the height direction, and
the male thread is present on the external side of the insulating tape at a bottom of the range in the height direction.

9. A rechargeable battery comprising:
an electrode assembly including electrodes on both sides of a separator;
a case including the electrode assembly and electrically connected to an electrode on one side of the electrode assembly; and
a cap assembly coupled with the case and electrically connected to another electrode of the electrode assembly, wherein
an external side of the electrode assembly and an internal side of the case are attached to face each other, and
at least one of the external side of the electrode assembly and the internal side of the case is in a form of a screw unit, wherein the screw unit includes:
a male thread on an insulating tape surrounding the electrode assembly, and
a female thread in an inserting member disposed inside the case and combined with the male thread.

10. The rechargeable battery as claimed in claim 9, wherein the inserting member extends for an entire range in a height direction of the insulating tape.

11. The rechargeable battery as claimed in claim 9, wherein the inserting member is attached to the inside of the case.

* * * * *